United States Patent
Kerr et al.

(10) Patent No.: US 6,809,891 B1
(45) Date of Patent: Oct. 26, 2004

(54) IMAGE DISPLAY DEVICE

(76) Inventors: Bradly A. Kerr, 306 Demers Ave., East Grand Forks, MN (US) 56721; Kristopher L. Marcott, 306 Demers Ave., East Grand Forks, MN (US) 56721; Jeffrey Hatcher, 306 Demers Ave., East Grand Forks, MN (US) 56721; Scott Gaddie, 306 Demers Ave., East Grand Forks, MN (US) 56721

( * ) Notice: Subject to any disclaimer, the term of this patent is extended or adjusted under 35 U.S.C. 154(b) by 0 days.

(21) Appl. No.: 10/453,262

(22) Filed: Jun. 3, 2003

Related U.S. Application Data

(60) Provisional application No. 60/385,501, filed on Jun. 3, 2002.

(51) Int. Cl.[7] .......................... G02B 9/00; G02B 27/02; G03B 21/00
(52) U.S. Cl. ...................... 359/797; 359/478; 359/479; 353/10
(58) Field of Search ........................... 353/10; 359/497, 359/498, 796, 797

(56) References Cited

U.S. PATENT DOCUMENTS

| | | | |
|---|---|---|---|
| 4,671,625 A | 6/1987 | Noble ........................ 359/726 |
| 5,782,547 A | 7/1998 | Machtig et al. ............... 353/28 |
| 5,886,818 A | 3/1999 | Summer et al. ............. 359/478 |
| 5,913,591 A | 6/1999 | Melville ....................... 353/28 |
| 5,944,403 A | 8/1999 | Krause ......................... 353/74 |
| 5,993,005 A | 11/1999 | Geranio ....................... 353/10 |
| 6,042,235 A | 3/2000 | Machtig et al. ............... 353/28 |
| 6,055,100 A | 4/2000 | Kirk ........................... 359/457 |
| 6,275,340 B1 | 8/2001 | Brown ........................ 359/630 |
| 6,315,416 B1 | 11/2001 | Dominguez-Montes et al. . 353/99 |
| 6,318,868 B1 | 11/2001 | Larussa ....................... 359/857 |

Primary Examiner—David N. Spector
(74) Attorney, Agent, or Firm—Eric Karich

(57) ABSTRACT

An image display device has a luminous image source operably positioned within a housing for projecting a projected image. The housing has a lens aperture covered by a lens assembly. The lens assembly is spaced apart from the luminous image source so that the lens assembly functions to projecting the luminous image outside of the internal chamber and beyond the lens assembly to appear as the image bubble that includes the projected image. The lens assembly includes a first lens, a second lens adjacent the first lens, and a third lens adjacent the second lens. The first lens has a first focal length that is approximately one-half of a focal length of the second or third lenses.

12 Claims, 3 Drawing Sheets

IMAGE DISPLAY DEVICE

CROSS-REFERENCE TO RELATED APPLICATIONS

This application for a utility patent claims the benefit of U.S. Provisional Application No. 60/385,501, filed Jun. 3, 2002.

STATEMENT REGARDING FEDERALLY SPONSORED RESEARCH

Not Applicable

BACKGROUND OF THE INVENTION

1. Field of the Invention

This invention relates generally to image display devices, and more particularly to an image display device that creates a luminous projected image that appears to float inside a bubble of light.

2. Description of Related Art

Projection devices are known in the art that project images so that they appear to float in the air. The two most common methods of producing floating objects has been by either reflecting an object from one or more curved mirrors (i.e., parabolic) or viewing an object property positioned behind one or more lenses. These methodologies are termed reflective or transmissive spatial object devices, respectively.

One means of providing a background image spatial object display is taught by Monroe (U.S. Pat. No. 5,257,130). In this disclosure, a scrim is used to permit a spatial object (produced by either reflective or transmissive means) to appear in front of the scrim (the optical rays forming the object having passed through the open mesh weave of the scrim). The scrim simultaneously serves as a front projection screen surface on which the background image can be projected.

Another means of providing a background image spatial object display is taught by Warren et al. (U.S. Pat. No. 5,311,357). Warren discloses the use of two concave mirrors to produce a spatial object with one of the concave mirrors being partially transparent. Behind this partially transparent mirror is an image display which can be readily seen by an observer through the partially transparent concave mirror.

Still another background image spatial object display is taught by Noble (U.S. Pat. No. 4,671,625). This transmissive spatial object display utilizes a combination of convex lenses with improved viewing of the spatial object provided by a visible reference around the area in which he spatial object appears to serve as a visual cue for the observer. This visible reference is taught primarily as the edge of a box (i.e., shroud) that extends out from the closest convex lens to the observer. A background image is provided by reflecting the spatial object off a partially transparent mirror with the image behind in an optical arrangement similar to Warren, except that this partially transparent mirror is flat and is not used to create the spatial object.

In Noble, the transmissive spatial object is created by a transmissive spatial object image produced by a transmissive object display (i.e., CRT). A first convex lens and a second convex lens manipulate the light rays to produce the transmissive spatial object. The transmissive spatial object is viewed from as the reflection of a partially transparent mirror. This mirror folds the beam of the transmissive spatial object and allows a background image (i.e., a poster or full motion display) to appear behind the partially transparent plane that enables the observer to comprehend the spatial position of the transmissive spatial object. As a result, the transmissive spatial object appears to float within the housing.

Machtig et al. U.S. Pat. No. 5,782,547 describes an improved transmissive spatial object display that provides a background image that appears to observers to have 3-D depth and includes the added advantages of permitting several viewers to observe the display simultaneously so that the background image appears on an accessible screen like that of televisions and computer monitors. The background image display is observed directly through a first Fresnel lens of a two Fresnel lens transmissive spatial object display which lens magnifies the background image display and also provides the front screen of the device. A first partially transparent mirror at 45 degrees separates the two Fresnel lenses permitting the background image display to be viewed solely through the first Fresnel lens. The first Fresnel lens serves the dual function of creating a first spatial object (in combination with the second Fresnel lens) and magnifying the background image. The magnified background image appears through the first Fresnel lens creating a pseudo 3-D appearance even though the background image is generated by a 2-dimensional display such as a CRT. Additional embodiments are configured without the second Fresnel lens so that the first Fresnel lens serves to magnify the background display's image and by itself creates the first spatial object.

Finally, Geranio, U.S. Pat. No. 5,993,005, teaches a video wall that has a plurality of spatial object image display devices, each spatial object image display device including a luminous display screen for providing a first image. The luminous display screen is operably engaged with a video wall computer which is operatively engaged with at least one video input device such as a video cassette recorder (VCR). The video wall computer acts as a splitter to distribute the output of the VCR to the plurality of spatial object image display devices. Each spatial object image display device also includes a lens operatively spaced apart from the luminous display screen for projecting the first image beyond the lens to appear as a first spatial object. The luminous display screen and the lens of each spatial object image display device are mounted within a housing that surrounds the luminous display screen and the lens, excluding substantially all light from within the housing, except through an aperture in the housing. The lens is operably mounted in proximity to and substantially covering the aperture, operably positioning the lens to project the first spatial object from the housing. The housing further includes a shroud extending from the perimeter of the aperture far enough to shield the lens, but not far enough to surround the first spatial object.

The above-described references are hereby incorporated by reference in full.

SUMMARY OF THE INVENTION

The present invention teaches certain benefits in construction and use which give rise to the objectives described below.

The present invention provides an image display device for projecting a projected image in front of the image display device in an image bubble that can be viewed from a wide viewing area. The display device includes a luminous image source operably positioned within a housing. The luminous image source is adapted for providing a luminous image that will form the projected image. The housing has an internal chamber that contains the luminous image source. The housing has a lens aperture covered by a lens assembly. The lens assembly is mounted to cover the lens aperture, and is spaced apart from the luminous image source so that the lens assembly functions to projecting the luminous image outside of the internal chamber and beyond the lens assembly to appear as the image bubble that includes the projected image. The lens assembly includes a first lens having a first focal surface and an opposing first flat surface that together provide a first focal length. The first lens is spaced a distance from the luminous image source such that the first flat surface is facing the luminous image source and generally normal to light being projected from the luminous image source. The lens assembly further includes a second lens that includes a second focal surface and an opposing second flat surface that together provide a second focal length. The second focal surface is adjacent the first focal surface. The lens assembly further includes a third lens that includes a third focal surface and an opposing third flat surface that together provide a third focal length. The third focal surface is adjacent the second flat surface. The first focal length is approximately one-half of the second or third focal lengths.

A primary objective of the present invention is to provide an image display device having advantages not taught by the prior art.

Another objective is to provide an image display device that projects a projected image within an image bubble.

A further objective is to provide an image display device that has superior optical performance characteristics.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figures 1, 2:
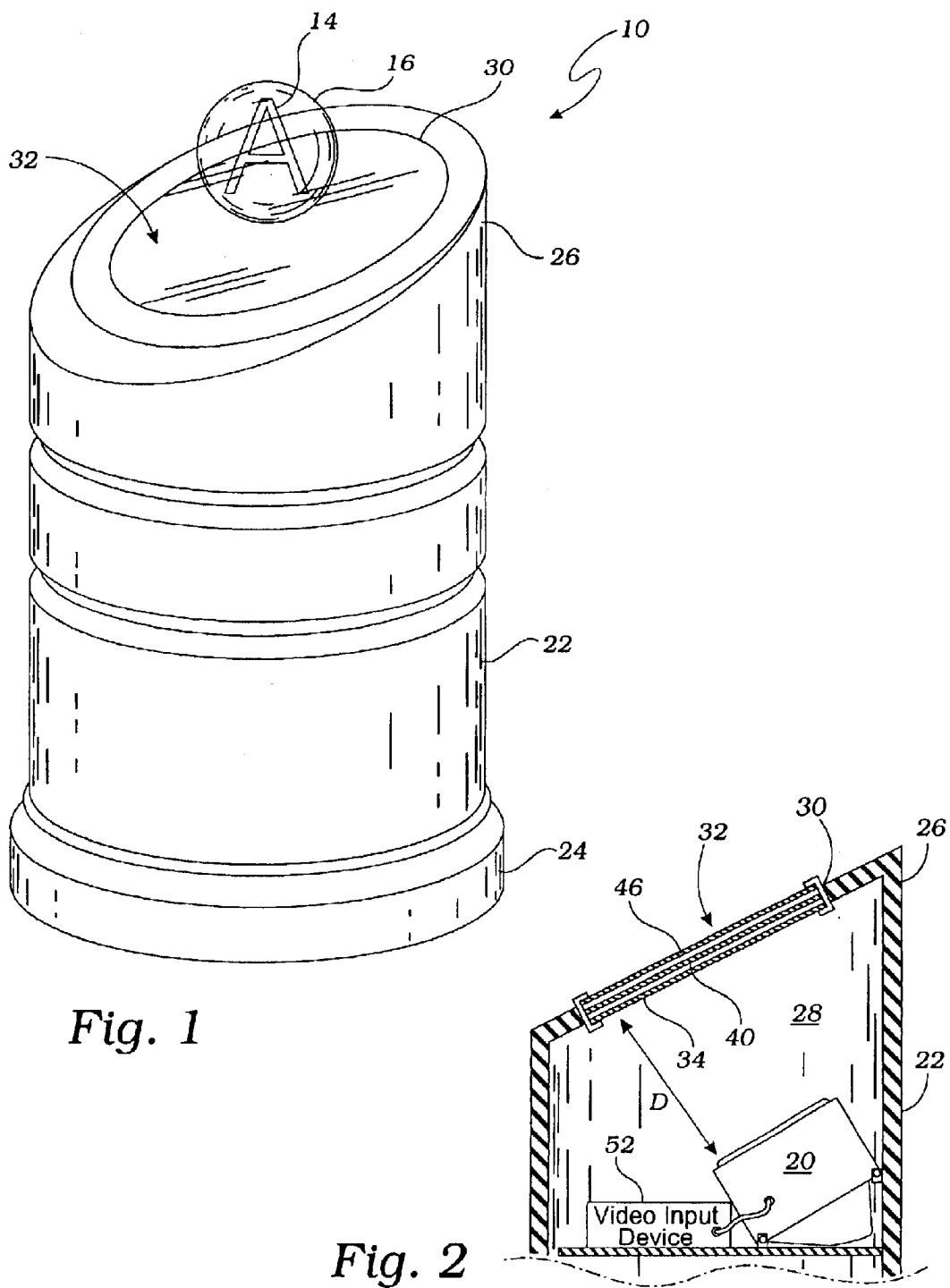
FIG. 1 is a perspective view of a first embodiment of the present invention, an image display device.
FIG. 2 is a sectional view thereof taken along line 2—2 in FIG. 1, the view illustrating a luminous image source within the device.

The above-described drawing figures illustrate the invention, an image display device 10 for projecting a projected image 14 in front of the image display device 10 in an image bubble 16 that can be viewed from a wide viewing area.

As shown in FIGS. 1–6, the image display device 10 includes a luminous image source 20, a housing 22 for containing the luminous image source 20, and a lens assembly 32 adapted for projecting the luminous image 12 to form the image bubble 16 that includes the projected image 14.

Figure 3:
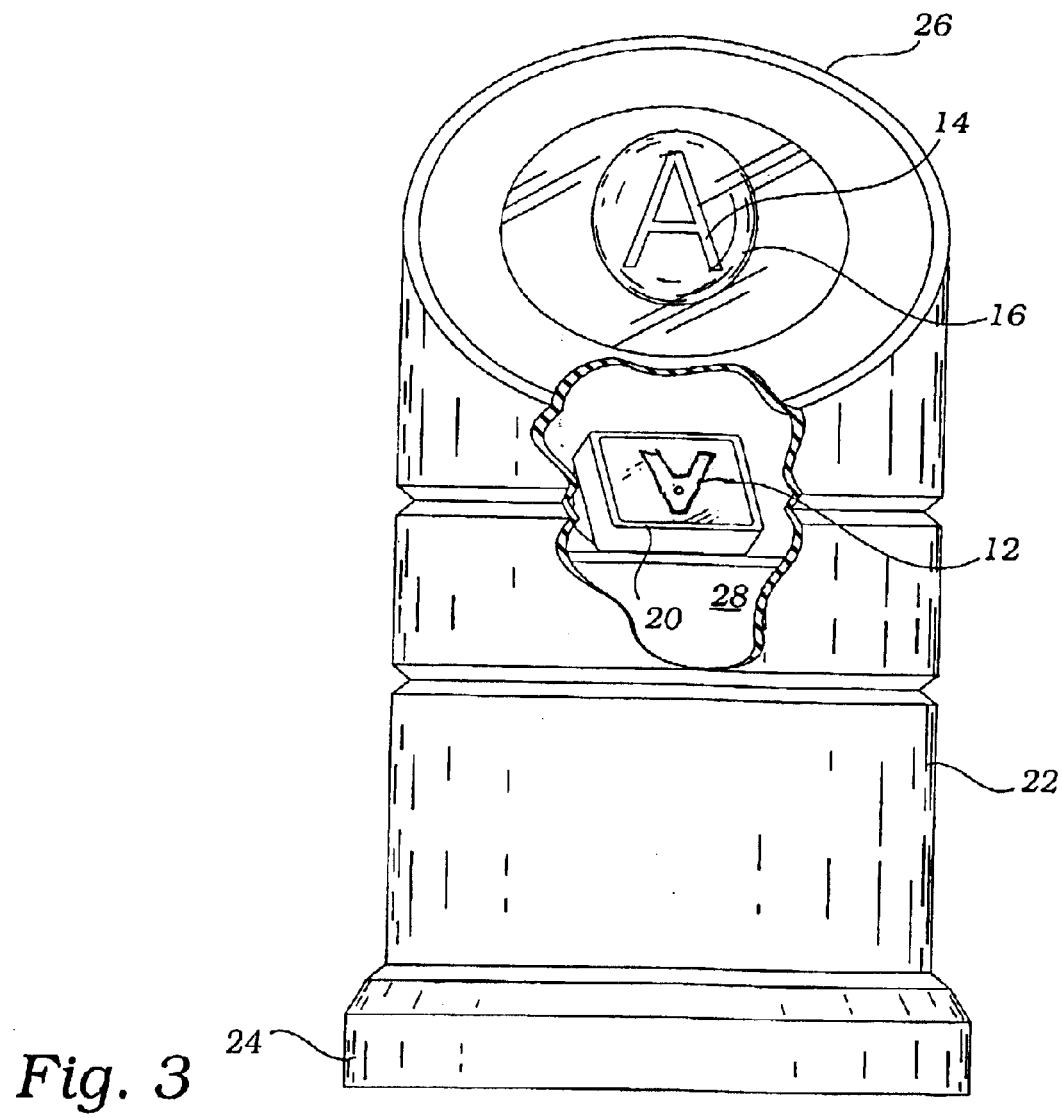
FIG. 3 is a front plan view thereof with a portion of the front broken away to illustrate a luminous image of the luminous image source.
Figure 5:
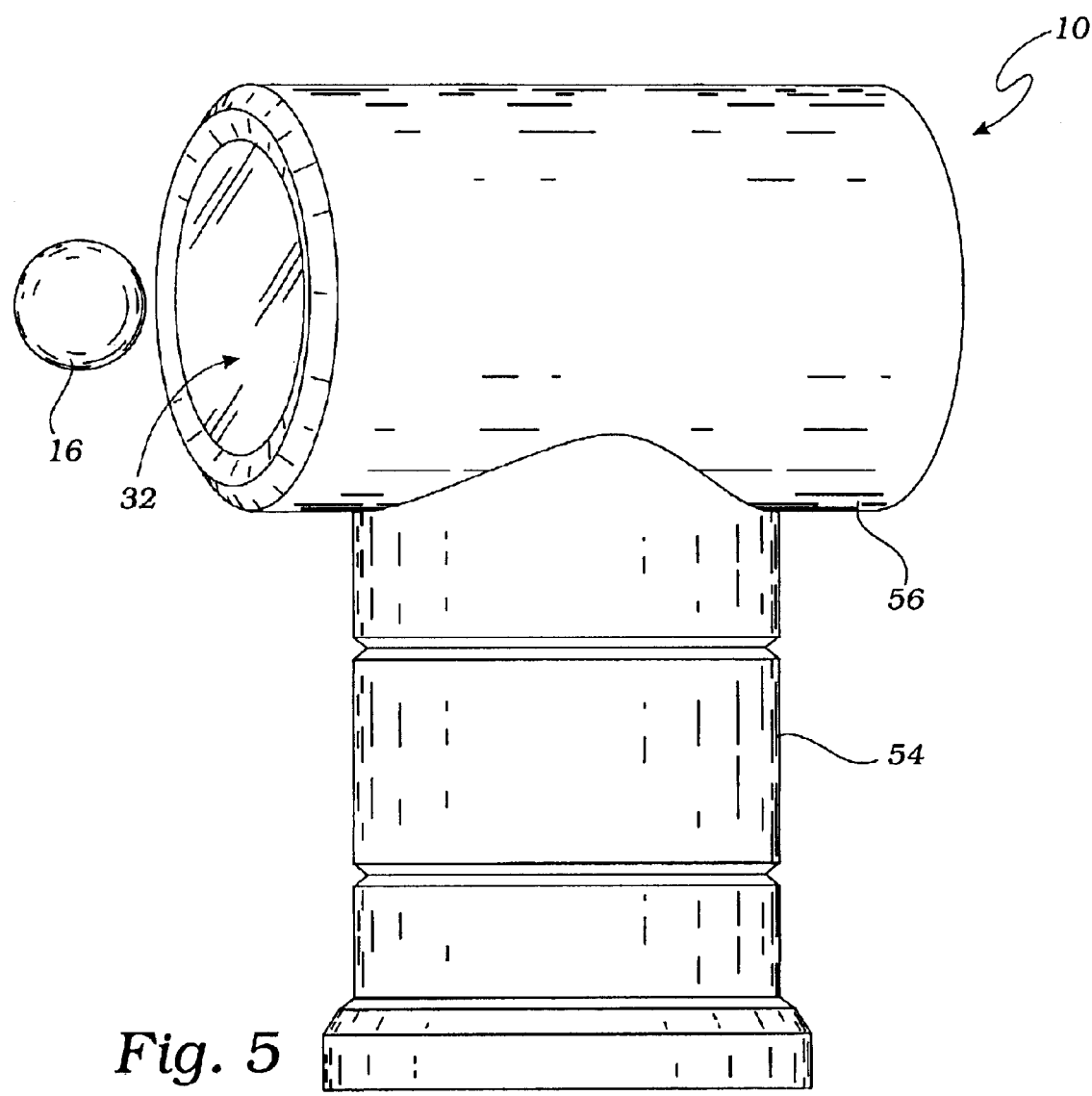
FIG. 5 is a perspective view of a second embodiment of the invention.
Figure 6:
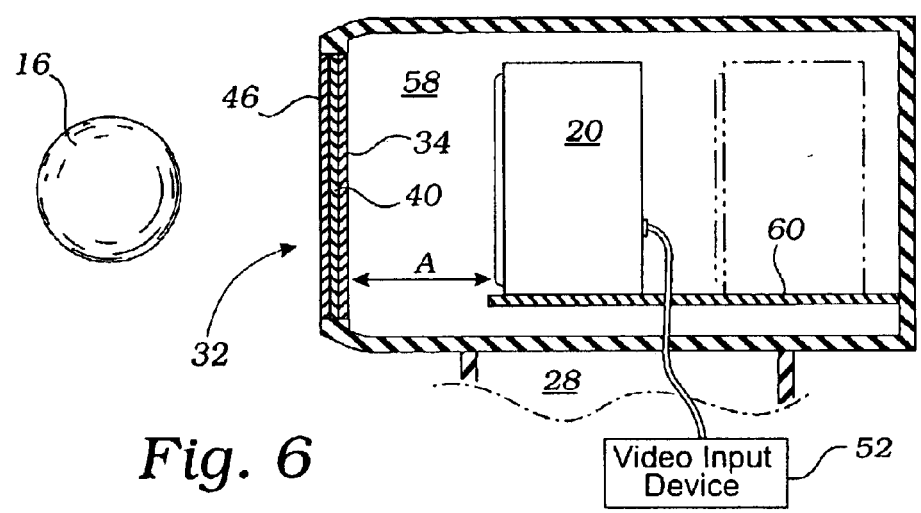
FIG. 6 is a sectional view thereof taken along line 6—6 in FIG. 5.

In a first embodiment, as shown in FIGS. 1–3, the housing 22 is a generally vertical cylindrical sidewall that is generally column shaped and adapted for projecting the luminous image 12 above the housing 22. In a second embodiment, as shown in FIGS. 5 and 6, the housing 22 includes both a vertical portion 54 and a horizontal portion 56 for projecting the luminous image 12 in front of the housing 22. Both embodiments are described in greater detail below.

As shown in FIGS. 1–3, the generally vertical cylindrical sidewall 22 extends from a base 24 to an upper perimeter 26, and functions to define an internal chamber 28 for containing the luminous image source 20. The base 24 functions to support the housing 22 on a surface such as the ground, a table, or other surface. In one embodiment, the base 24 may be formed by the generally circular terminal edge of the generally vertical cylindrical sidewall 22. The upper perimeter 26 functions to define a lens aperture 30 that is used to mount the lens assembly 32.

Figure 4:
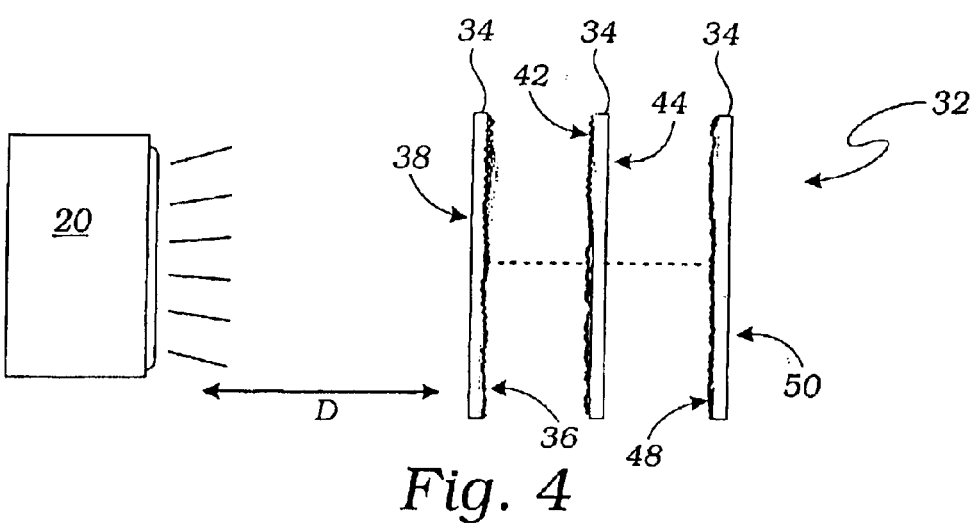
FIG. 4 is a side elevational view of the luminous image source and a lens assembly, the lens assembly being exploded to illustrate the first, second, and third lenses of the lens assembly.

As shown in FIGS. 2–4, the luminous image source 20 is adapted for providing a luminous image 12 that will form the projected image 14. The luminous image source 20 may be a CRT display such as a television or monitor, an LCD display, a plasma display, or any similar device that can be used to project the luminous image 12.

As shown in FIG. 2, the housing 22 includes a lens aperture 30, but preferably otherwise encloses the luminous image source 20 to exclude outside light. The lens assembly 32 is mounted to cover the lens aperture 30. The lens assembly 32 is spaced apart from the luminous image source 20 for projecting the luminous image 12 outside of the internal chamber 28 and beyond the lens assembly 32 to appear as the image bubble 16 that includes the projected image 14.

As shown in FIGS. 2 and 4, the lens assembly 32 includes a first lens 34 and a second lens 40, and preferably also includes a third lens 46. The lens assembly 32 functions to form the projected image 14 and the image bubble 16. The first lens 34 has a first focal surface 36 and an opposing first flat surface 38 that together provide a first focal length. The first lens 34 is spaced a distance from the luminous image source 20 such that the first flat surface 38 is facing the luminous image source 20 and generally normal to light being projected from the luminous image source 20. The second lens 40 has a second focal surface 42 and an opposing second flat surface 44 that together provide a second focal length. The second focal surface 42 is preferably positioned adjacent the first focal surface 36. The first focal length is preferably approximately one-half of the second focal length.

While the second flat surface 44 faces the luminous image source 20 in the preferred embodiment, other configurations are also possible, as long as either the first lens 34 or the second lens 40 is positioned such that either the first or second focal surfaces 36 and 42 is facing the luminous image source 20. This configuration functions to generate the image bubble 16.

The third lens 46 includes a third focal surface 48 and an opposing third flat surface 50 that together provide a third focal length. The third focal surface 48 is preferably positioned adjacent the second flat surface 44. In the preferred embodiment, the third focal length is approximately equal to the second focal length, or approximately double the first focal length.

The lens assembly 32 is constructed of an optically acceptable material, preferably plastic, and is preferably made of Fresnel lenses to reduce weight and cost, although other shapes and materials are acceptable if they provide the desirable optical characteristics. The construction of and characteristics of the Fresnal lenses are described in greater detail in the patents described above and incorporated by reference.

For purposes of this application, the term "approximately," as in "approximately one-half of the second focal length" or "approximately double the first focal length," shall be construed to mean including a +/−20% deviation, preferably +/−10% deviation. For purposes of this application, the term "adjacent" shall mean either directly abutting, or spaced apart a small distance such that there is no impairment of the optical characteristics of the lens assembly 32.

As shown in FIG. 2, a video input device 52 such as a videocassette recorder, DVD player, or other equivalent device is operably attached to the luminous image source 20 to play a prerecorded image of the luminous image 12. As described in the prior art, the prerecorded image is preferably pre-formatted to remove background "noise" that may interfere with the image generation. The diameter of the image bubble 16 is approximately equal to the distance between the luminous image source 20 and the first lens 34. By adjusting the distance and the lens assembly 32, the user can adjust the size of the image bubble 16 to suit his or her needs.

In the most preferred embodiment, the base 24 has a diameter of 28 inches, a back wall that is 45 inches tall, a front wall that is 35 inches tall, and a lens assembly 32 with a diameter of 19.5 inches. Obviously, these dimensions will vary depending upon the commercial embodiment of the invention. The housing 22 can be constructed of any rigid and generally durable material such as particle-board, sheet plastic or steel, or other similar material.

In the second embodiment, as shown in FIGS. 5 and 6, the housing 22 includes both a vertical portion 54 and a horizontal portion 56 for projecting the luminous image 12 in front of the housing 22. The vertical portion 54 is generally similar to the first embodiment, only the internal chamber 28 is not required, although it can be used to house the video input device 52 if desired.

In this embodiment, the horizontal portion 56 includes a horizontal internal compartment 58 that is shaped to hold the luminous image source 20. The luminous image source 20 can be slidably mounted on a slider 60, thereby enabling the size of the projected image 14 to be varied. While the cylindrical structures described above are currently preferred, alternative shapes and structures could also be adapted to the present invention and should be considered within the scope of the below-described claims. These and other equivalent alternative embodiments should be considered within the scope of the invention.

While the invention has been described with reference to at least one preferred embodiment, it is to be clearly understood by those skilled in the art that the invention is not limited thereto. Rather, the scope of the invention is to be interpreted to include all equivalent constructions and to all variations that one skilled in the art could contrive given the teachings of the present invention.

What is claimed is:

1. An image display device for projecting a projected image in front of the image display device in an image bubble that can be viewed from a wide viewing area, the display device comprising:

a luminous image source for providing a luminous image that will form the projected image;

a housing having an internal chamber that contains the luminous image source, the housing having a lens aperture; and a lens assembly mounted to cover the lens aperture, the lens assembly being spaced apart from the luminous image source for projecting the luminous image outside of the internal chamber and beyond the lens assembly to appear as the image bubble that includes the projected image, the lens assembly including a first lens having a first focal surface and an opposing first flat surface that together provide a first focal length, the first lens being spaced a distance from the luminous image source such that the first flat surface is facing the luminous image source and generally normal to light being projected from the luminous image source, the lens assembly further including a second lens that includes a second focal surface and an opposing second flat surface that together provide a second focal length, the second focal surface being adjacent the first focal surface, and wherein the first focal length is approximately one-half of the second focal length.

2. The image display device of claim 1 wherein the housing includes a generally vertical cylindrical sidewall that extends from a base to an upper perimeter, the upper perimeter defining the lens aperture.

3. The image display device of claim 1 wherein the housing includes a vertical portion that is adapted to support a horizontal portion, the horizontal portion having the internal chamber and the lens aperture.

4. The image display device of claim 1 wherein the lens assembly further includes a third lens that includes a third focal surface and an opposing third flat surface that together provide a third focal length, the third focal surface being adjacent the second flat surface.

5. The image display device of claim 1 wherein the first focal length is approximately one-half of the third focal length.

6. An image display device for projecting a projected image in front of the image display device in an image bubble that can be viewed from a wide viewing area, the display device comprising:

a luminous image source for providing a luminous image that will form the projected image;

a housing having an internal chamber that contains the luminous image source, the housing having a lens aperture; and a lens assembly mounted to cover the lens aperture, the lens assembly being spaced apart from the luminous image source for projecting the luminous image outside of the internal chamber and beyond the lens assembly to appear as the image bubble that includes the projected image, the lens assembly including a first lens having a first focal surface and an opposing first flat surface that together provide a first focal length, the first lens being spaced a distance from the luminous image source such that the first flat surface is facing the luminous image source and generally normal to light being projected from the luminous image source, the lens assembly further including a second lens that includes a second focal surface and an opposing second flat surface that together provide a second focal length, the second focal surface being adjacent the first focal surface, the lens assembly further including a third lens that includes a third focal surface and an opposing third flat surface that together provide a third focal length, the third focal surface being adjacent the second flat surface, and wherein the first focal length is approximately one-half of either the second or third focal lengths.

7. The image display device of claim 6 wherein the housing includes a generally vertical cylindrical sidewall that extends from a base to an upper perimeter, the upper perimeter defining the lens aperture.

8. The image display device of claim 6 wherein the housing includes a vertical portion that is adapted to support a horizontal portion, the horizontal portion having the internal chamber and the lens aperture.

9. An image display device for projecting a projected image in front of the image display device in an image bubble that can be viewed from a wide viewing area, the display device comprising:

a luminous image source for providing a luminous image that will form the projected image;

a housing having an internal chamber that contains the luminous image source, the housing having a lens aperture; and a lens assembly mounted to cover the lens aperture, the lens assembly being spaced apart from the luminous image source for projecting the luminous image outside of the internal chamber and beyond the lens assembly to appear as the image bubble that includes the projected image, the lens assembly including a first lens having a first focal surface and an opposing first flat surface that together provide a first focal length, the first lens being spaced a distance from the luminous image source, the lens assembly further including a second lens that includes a second focal surface and an opposing second flat surface that together provide a second focal length, and wherein the first focal length is approximately one-half of the second focal length;

wherein either the first or second lenses is positioned such that either the first or second focal surfaces is facing the luminous image source.

10. The image display device of claim 9 wherein the housing includes a generally vertical cylindrical sidewall that extends from a base to an upper perimeter, the upper perimeter defining the lens aperture.

11. The image display device of claim 9 wherein the housing includes a vertical portion that is adapted to support a horizontal portion, the horizontal portion having the internal chamber and the lens aperture.

12. The image display device of claim 9 wherein the lens assembly further includes a third lens that includes a third focal surface and an opposing third flat surface that together provide a third focal length, the third focal surface being adjacent the second flat surface.

* * * * *